United States Patent [19] [11] 4,448,863
Terrell [45] May 15, 1984

[54] ELECTRIC STORAGE BATTERIES

[75] Inventor: Christopher Terrell, London, England

[73] Assignee: Chloride Group Limited, London, England

[21] Appl. No.: 318,134

[22] Filed: Nov. 4, 1981

[30] Foreign Application Priority Data

Nov. 5, 1980 [GB] United Kingdom ............... 8035534

[51] Int. Cl.³ ...................... H01M 2/02; H01M 2/08; H01M 2/26
[52] U.S. Cl. ................................... 429/178; 429/180; 429/121; 429/65
[58] Field of Search ............... 429/121, 178, 179, 180, 429/182, 158, 65

[56] References Cited

U.S. PATENT DOCUMENTS 2,880,261 3/1959 Duncan ............................... 429/178
3,836,401 9/1974 Niklas et al. ........................ 429/158

FOREIGN PATENT DOCUMENTS 1374202 11/1974 United Kingdom ............... 429/178

Primary Examiner—Brian E. Hearn
Assistant Examiner—Stephen J. Kalafut
Attorney, Agent, or Firm—Oblon, Fisher, Spivak, McClelland & Maier

[57] ABSTRACT

A battery has a container sealed by a lid in which two shallow recesses are formed. Within each recess is a terminal which does not project out of the recess and which has a tapped hole afforded by a hard metal insert. Two elongate terminal connectors are provided with a hole at one end and a current take-off portion at the other end. The battery is sold with the recesses closed by two flush cover plates and two terminal connectors of desired type. The cover plates are removed and the terminal connectors connected to the terminals by means of screws. A part of each terminal connector is accommodated in the recesses thus restraining the terminal connectors from rotation.

13 Claims, 6 Drawing Figures

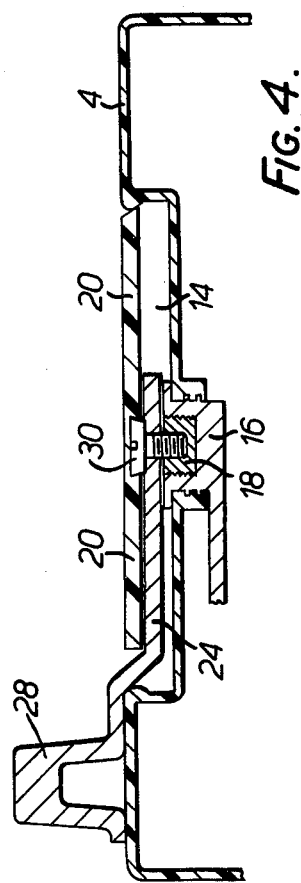
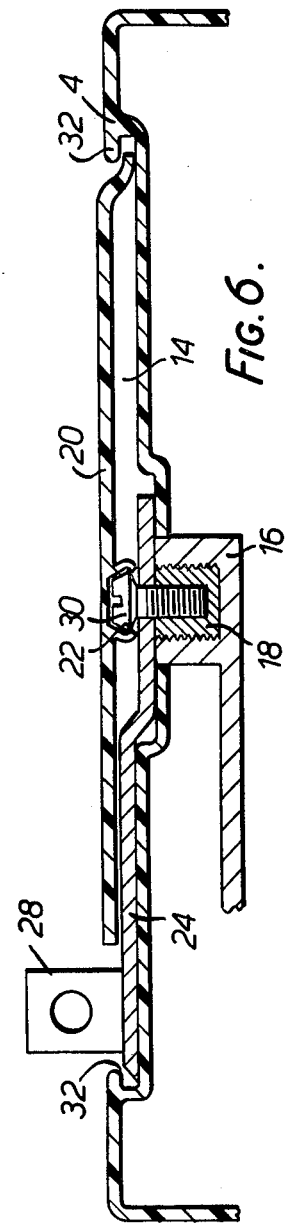

ELECTRIC STORAGE BATTERIES

BACKGROUND OF THE INVENTION

The present invention relates to electric storage batteries, particularly automotive batteries of lead acid type and is more particularly concerned with such batteries of recombinant type. Recombinant batteries are those batteries which contain substantially no free unabsorbed electrolyte and in which the gas evolved during operation or charging is substantially induced to recombine within the battery and is thus not vented to the atmosphere.

Car manufacturers provide the leads which are intended to be connected to the car battery different types of cable end terminal connector, and for this reason automotive battery manufacturers are obliged to produce different batteries which are identical in all respects except the shape and/or disposition of the battery terminal connectors. The most common forms of connector are a frusto-conical pillar adapted to be engaged by a cable end terminal connector of clamping ring type or of inverted cup shape having a central screw which is screwed into a tapped hole in the pillar and an upstanding square section lug having a hole in it adapted to be engaged by a cable end terminal connector having a bolt which passes through the hole in the lug.

This variety of battery types obliges battery wholesalers and retailers to hold larger stocks than would be the case if all automotive batteries had the same type of battery terminal connector. Automotive batteries are in any case relatively difficult to store and because of the presence of the battery terminal connectors which project upwardly from their lid they are not capable of stacking, one above the other.

Accordingly it is an object of the invention to provide an electric storage battery of a construction which will permit smaller stocks to be held and a further object is to enable such batteries to be readily stackable.

SUMMARY OF THE INVENTION

Accordingly to the present invention an electric storage battery includes two battery terminals whose outmost surface is flush with or recessed in an outer surface of the container and two terminal connectors, the two terminal connectors each affording an upstanding current take-off portion and being releasably connectable both mechanically and electrically to a respective one of the battery terminals. Preferably each battery terminal is accommodated in a respective recess in a wall of the battery container, and the terminal connectors are so constructed that when they are connected to the terminals at least a part of each of them is accommodated in a respective one of the recesses. The recesses are preferably formed in the battery lid.

The provision of a battery and separate terminal connectors which are releasably connectable to the battery terminals enables manufacturers to reduce the variety of batteries they produce since those types which differ only in the construction of their terminal connectors may be replaced by a single type to which the varying conventional types of terminal connector may be connected subsequently, e.g. by the user. The fact that the terminals do not project beyond the surface of the container, e.g. beyond the lid, enables batteries to be simply stacked, one on the other when they are being stored, which was previously impossible due to the presence of the projecting current take-off portions of their terminal connectors.

According to a further aspect of the present invention, an electric storage battery includes a container in one wall of which two elongate recesses are formed, each recess accommodating a respective battery terminal which does not extend beyond the wall in which the recess is formed and further includes two elongate terminal connectors each affording an upstanding current take-off portion and being releasably connectable both mechanically and electrically to a respective one of the battery terminals, the battery and the terminal connectors being so constructed and arranged that when the terminal connectors are connected to the battery terminals at least a part of each of them is accommodated in a respective one of the recesses. The accommodation of at least part of the terminal connectors in the recesses results in their being restrained from rotation and largely protected from damage.

The terminal connectors may be connectable to the battery terminals in a number of ways, but in the preferred embodiment the terminal connectors, which are elongate, are provided with a hole adjacent one end, the battery terminals are provided with a tapped hole, and two screws are provided whereby the terminal connectors are connectable to the terminals by passing a respective screw through each hole and screwing it into the associated tapped hole. In the case of a lead acid battery, the terminals will be of lead or a lead alloy which is rather soft, and the tapped holes are therefore preferably provided in hard metal inserts set into the terminals.

Preferably each terminal connector is of stepped construction having a lower portion in which the hole is formed and an upper portion with which the current take-off portion is integral. In one form of the invention the upper portion rests on the battery lid adjacent the recess when the terminal connectors are connected to the terminals. In an alternative construction each recess is also of stepped construction and both the upper and lower portions of each terminal connector are accommodated in the respective recess when the terminal connectors are connected to the terminals, but the current take-off portion projects out of the recess. In the latter case, each end of the recesses preferably has an overhanging edge, and the terminal connectors are so dimensioned that when they are connected to the terminals the end remote from the hole is underneath one of the overhanging edges.

Conveniently the recesses are substantially twice as long as the terminal connectors. This permits the terminal connectors to be connected the same way round in their respective recesses or the opposite way so the terminal current take-off portions may be positioned in adjacent or opposite corners of the lid.

The most preferred embodiment of the invention includes two cover plates dimensioned to be received in the recess, and which preferably have substantially the same cross-sectional area as the recesses and are adapted to close the recesses and to be substantially flush with the surface of the container in which the recesses are formed. These cover plates can be positioned in the recesses prior to selling the battery but then removed prior to connection of the battery terminal connectors. Preferably the cover plates include a portion of reduced thickness whereby a portion of each cover plate may be broken off and the recesses, terminal connectors and cover plates are so dimensioned that when the terminal connectors are connected to the terminals a portion of the cover plates may be replaced in the recesses, thereby concealing a part of the terminal connectors.

Further features and details of the invention will be apparent from the following description of two specific embodiments which is given by way of example only with reference to the accompanying drawings in which:

BRIEF DESCRIPTION OF THE DRAWINGS

FIG. 4 is a fragmentary cross-sectional elevation of the battery shown in FIG. 1 to which a terminal connector of the type generally shown in FIG. 2 is connected;

FIG. 5 is a sectional elevation of a cover plate for covering the battery terminal recesses; and FIG. 6 is a view similar to FIG. 4 of a modified embodiment.

DESCRIPION OF THE PREFERRED EMBODIMENTS

Figure 1:
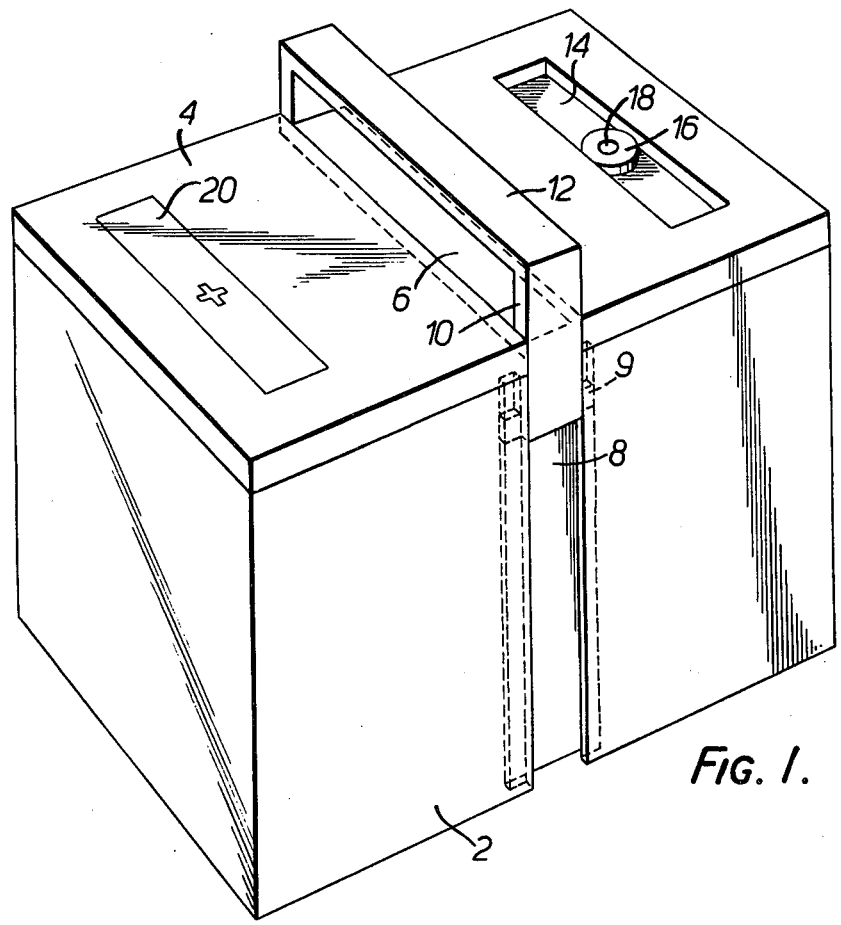
FIG. 1 is a perspective view of a 12 V recombinant lead acid automotive battery with recessed terminals prior to connection of the battery terminal connectors.

The battery shown in FIG. 1 is a recombinant 12 volt automotive battery within a substantially cuboid container 2 sealed by a lid 4. Within the container are six cells connected in series, each cell comprising alternating positive and negative plates interleaved with highly absorbent microfine glass fibre separator material and containing substantially no free unabsorbed electrolyte.

Extending transversely across the lid 4 is an elongate recess 6 which communicates with a vertically extending undercut recess 8 in each of the battery side walls. A U shaped carrying handle having two limbs 10 connected by a cross-piece 12 is slidably received in these recesses with laterally projecting shoulders 9 on the limbs 10 being accommodated in the undercut portions of the recesses 8 so that the handle can slide between a position in which the upper surface of the cross-piece 12 is flush with the upper surface of the lid 4 and a position shown in chain-dotted lines in which it stands proud of the lid and can be used to carry the battery. The handle is placed in position by distorting it against its resilience and is retained in this position by virtue of the fact that the shoulders 9 are slidably retained in the undercut portions of the recesses 8.

On each side of the carrying handle there is a shallow, elongate rectangular recess 14 extending parallel to the cross-piece 12 of the carrying handle. Centrally disposed within each recess 14 is a battery terminal 16 of lead or lead alloy which extends through and is sealed to the bottom of the recess and is connected to one of the battery plate straps as best seen in FIG. 4. Each terminal 16 has within it a hard metal insert 18 affording a centrally disposed tapped hole. The upper surface of each terminal 16 is below the upper surface of the battery lid 4.

When the battery is sold, the carrying handle will be in its retracted position with its upper surface flush with that of the battery and each recess 14 will be covered by a cover plate 20 of polypropylene or other plastics material (only one of which is shown in FIG. 1). The battery thus presents a substantially smooth and continuous upper surface and a number of such batteries can therefore be stacked one above the other without difficulty. The cover plate 20 is shown in section in FIG. 5 and is provided with a central circular recess 22 and a portion of reduced thickness 23 extending across its width adjacent one end, the purpose of which will be described below. The cover plate is of substantially identical size to its associated recess and its edges are somewhat bevelled and cooperate with an inwardly projecting lip at the upper edge of the recess when the cover plate is received as a push fit in its recess 14.

Figure 2:
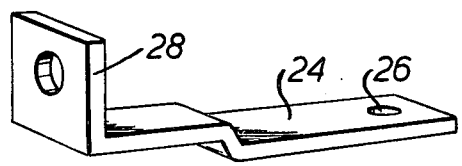
FIGS. 2 and 3 are perspective views of two alternative forms of battery terminal connector.
Figure 3:
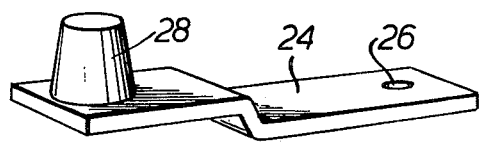

A purchaser will purchase not only a battery as shown in FIG. 1 but also a pair of battery terminal connectors 24 of the type shown in FIG. 2 or FIG. 3 depending on the type of cable end terminal connectors with which his car is provided. As may be seen, each connector 24 is of elongate strip form having a step formed about two thirds of the way along its length. Each connector therefore comprises a lower strip portion in which a hole 26 is formed and integral with which is an upper strip portion integral with which in turn is an upstanding current take-off portion 28 of apertured lug form in the construction shown in FIG. 2 or of tapered pillar form in the construction shown in FIG. 3. The connectors 24 are of high conductivity material, such as brass or copper, and they may be optionally plated with lead or nickel to prevent corrosion occurring.

The user therefore removes the two cover plates 20 by means of a screwdriver or a similar tool and then connects the selected pair of terminal connectors 24 to the terminals 16. This is effected by placing the lower strip portion of the connectors 24 in the recess 14, passing a screw 30 through the hole 26 and screwing the screw into the tapped hole in the metal insert 18. Preferably each terminal connector is provided with a positive or negative polarity symbol and the holes in the connectors 24 and the inserts 18 and the associated screws are of different sizes for the different polarities to ensure that each terminal connector may only be connected to a terminal of the correct polarity.

As may be seen in FIG. 4, the terminal connector 24 is dimensioned with respect to the recess 14 such that the lower portion is accommodated within the recess, the step is positioned at the edge of the recess, and the upper portion sits securely on the upper surface of the battery lid 4. The user then breaks the cover plates 20 at the portions of reduced thickness 23, and the larger portion is replaced in position in the recesses 14, thereby covering the major proportion of the connectors 24 and shielding them from dirt and damage and giving the battery a neater appearance. The heads of the screws 30 are received as a push fit in the recesses 22 and this additionally secures the cover plates in position.

By virtue of the facts that the hole 26 is positioned adjacent one end of the connectors and that the terminals 16 are centrally disposed in the recesses 14, the terminal connectors may be connected the same way round to provide a battery with current take-off portions, or terminal pillars in adjacent corners or the opposite way round to provide a battery with the terminal pillars in opposite corners.

FIG. 6 shows a slightly modified construction and similar reference numerals are used to designate similar parts. In this embodiment the recesses are somewhat longer and are themselves of stepped form having a shape corresponding to that of the terminal connectors 24. The terminal connectors are thus entirely accommodated in the recesses with the exception of the current take-off portions or terminal pillars 28 which project out of the recesses. The upper and lower portions of the terminal connectors are thus restrained from lateral movement along their entire length, which enables them better to resist the relatively high forces that may be applied to them when attempting to remove a rather old cable end terminal connector from engagement with the terminal pillars 28. In this embodiment the two ends of the recesses are provided with an overhanging edge 32 and the terminal connectors are so dimensioned that when in position their free end extends under one of the edges 32 which therefore assists the screw 30 in resisting upward movement of the terminal connector. The other overhanging edge 32 is used to retain one end of the cover plate 20 above the terminal connector, and the cover plate is again provided with a recess 22 for a push fit engagement with the head of the screw 30.

Thus, before connecting the terminal connectors and with the carrying handle in its recessed position, the battery has a neat compact appearance and a substantially flat upper surface which permits several such batteries to be stacked. Battery terminal connectors of the required type may be simply connected and these may be disconnected and retained if it should be desired to exchange the battery for a new one.

Whilst the terminal connectors have been described as having an upstanding current take-off portion, it will be appreciated that the current take-off portion may extend downwardly at the side of the battery to constitute a battery with side terminals as is commonly the case with automotive batteries.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. An electric storage battery kit comprising:
    (a) a container having a plurality of walls, one of said walls having an outer surface and means defining two spaced elongate recesses, each of said spaced elongate recesses having two ends and an overhanging edge;
    (b) two battery terminals, each of said battery terminals being accommodated in a respective one of said spaced elongate recesses and not extending beyond said outer surface of said one of said walls;
    (c) two terminal connectors, each of said terminal connectors including:
        (i) an elongate portion which is adapted to be releasably connected both mechanically and electrically to a respective one of said battery terminals and
        (ii) a current take-off portion adapted to be releasably connected to a battery cable; and
    (d) said terminal connectors and said recesses being shaped and dimensioned so that:
        (i) when said terminal connectors are connected to said battery terminals, at least a part of each of said elongate portions is accommodated in said respective one of said spaced elongate recesses and said current take-off portions extend above said one of said walls, and
        (ii) when said terminal connectors are connected to said battery terminals, one end of the elongate portion of each of said terminal connectors is underneath one of said overhanging edges.

2. An electric storage battery kit as recited in claim 1 wherein each of said two terminal connectors is releasably connected to a respective one of said battery terminals.

3. An electric storage battery kit as recited in claim 1 wherein said electric storage battery is a lead acid automotive battery.

4. A electric storage battery kit as recited in claim 1 wherein said one of said walls is the lid of said electric storage battery.

5. A electric storage battery kit as recited in claim 1 wherein:
    (a) each of said elongate portions of said terminal connectors has two ends;
    (b) one of the two ends of each of said elongate portions is connected to the associated current take-off portion;
    (c) a hole is provided adjacent the other of the two ends of each of said elongated portions;
    (d) each of said battery terminals is provided with a tapped hole; and
    (e) said electric storage battery kit further comprises two screws by means of which said terminal connectors are connectable to said battery terminals.

6. A electric storage battery kit as recited in claim 5 wherein each of said elongate portions is of stepped construction having:
    (a) a lower portion in which said hole is formed; and
    (b) an upper portion with which said current take-off portion is integral.

7. An electric storage battery kit as recited in claim 6 wherein each of said upper portions engages said outer surface of said one of said walls adjacent the corresponding one of said spaced elongate recesses when said terminal connectors are connected to said battery terminals.

8. An electric storage battery kit as recited in claim 6 wherein:
    (a) each of said spaced elongate recesses is of stepped form corresponding to the stepped form of the elongate portion of the associated terminal connector; and
    (b) both said upper portion and said lower portion of each of said terminal connectors are accommodated in the associated one of said spaced elongate recesses when said terminal connectors are connected to said battery terminals, but said current take-off portions project out of said spaced elongate recesses.

9. An electric storage battery kit as recited in claim 8 wherein, when said terminal connectors are connected to said battery terminals, the ends of said elongate portions of said terminal connectors remote from said holes are underneath a respective one of said overhanging edges.

10. An electric storage battery kit as recited in claim 1 and further comprising two cover plates, each of said cover plates being sized and shaped to be releasably received in and to close one of said spaced elongate recesses, said cover plates having a surface which is substantially flush with said outer surface of said one of said walls when said cover plates are received in said spaced elongate recesses.

11. An electric storage battery kit as recited in claim 10 wherein:
    (a) said cover plates each have a portion of reduced thickness, whereby each of said cover plates may be broken in two;

(b) said spaced elongate recesses, said terminal connectors, and said cover plates are shaped and dimensioned so that, when said terminal connectors are connected to said battery terminals, a portion of each of said cover plates may be replaced in one of said spaced elongate recesses, thereby concealing a part of said terminal connectors; and (c) the current take-off portion of each of said terminal connectors projects above the associated one of said portions of said cover plates.

12. An electric storage battery kit as recited in claim 1 comprising a plurality of said terminal connectors, different pairs of which are adapted to be releasably connected to battery cables having differently shaped connector portions.

13. An electric storage battery kit comprising:

(a) a container having a plurality of walls, one of said walls having an outer surface and means defining two spaced elongated recesses;

(b) two battery terminals, each of said battery terminals being accommodated in a respective one of said spaced elongate recesses and not extending beyond said outer surface of said one of said walls;

(c) two terminal connectors, each of said terminal connectors including:
  (i) an elongate portion which is adapted to be releasable connected both mechanically and electrically to a respective one of said battery terminals and
  (ii) a current take-off portion adapted to be releasably connected to a battery cable;

(d) said terminal connectors and said recesses being shaped and dimensioned so that, when said terminal connectors are connected to said battery terminals, at least a part of each of said elongate portions is accommodated in said respective one of said spaced elongate recesses and said current take-off portions extend above said one of said walls; and (e) said spaced elongate recesses being substantially twice as long as said terminal connectors and said battery terminals being centrally positioned in said spaced elongate recesses, whereby said terminal connectors may be connected to said battery terminals so as to extend therefrom in either direction.

* * * * *